United States Patent
Jarczyk (12)

(10) Patent No.: US 8,749,474 B2
(45) Date of Patent: Jun. 10, 2014

(54) LCD CIRCUIT AND A METHOD FOR TRIGGERING AT LEAST ONE PIXEL OF A LIQUID CRYSTAL DISPLAY

(75) Inventor: Alexander Jarczyk, Wohnsitz (DE)

(73) Assignee: QUALCOMM Incorporated, San Diego, CA (US)

( * ) Notice: Subject to any disclaimer, the term of this patent is extended or adjusted under 35 U.S.C. 154(b) by 1463 days.

(21) Appl. No.: 12/299,678

(22) PCT Filed: May 4, 2007

(86) PCT No.: PCT/EP2007/054348
§ 371 (c)(1),
(2), (4) Date: Aug. 31, 2009

(87) PCT Pub. No.: WO2007/128792
PCT Pub. Date: Nov. 15, 2007

(65) Prior Publication Data
US 2010/0013814 A1    Jan. 21, 2010

(30) Foreign Application Priority Data
May 5, 2006 (DE) .......................... 10 2006 021 099

(51) Int. Cl.
G09G 3/36 (2006.01)
(52) U.S. Cl.
USPC ............................ 345/104; 345/174; 345/208
(58) Field of Classification Search
CPC .............................. G06F 3/0412; G02F 1/3338
USPC .......................... 345/208, 156, 173, 104, 174
See application file for complete search history.

(56) References Cited

U.S. PATENT DOCUMENTS 3,569,614 A * 3/1971 Hanlon ......................... 348/791
5,583,478 A * 12/1996 Renzi ......................... 340/407.1
(Continued)

FOREIGN PATENT DOCUMENTS

| EP | 0340096 A1 | 11/1989 |
|---|---|---|
| JP | 07020436 A * | 1/1995 |
| WO | WO 2004049094 A2 * | 6/2004 |

OTHER PUBLICATIONS

International Search Report mailed Oct. 29, 2007, in PCT Application No. PCT/EP2007/054348.

(Continued)

*Primary Examiner* — Dorothy Harris
(74) *Attorney, Agent, or Firm* — Mahamedi Paradice Kreisman LLP

(57) ABSTRACT

The invention relates to an LCD circuit and a method for triggering at least one pixel (3) of a liquid crystal display (LCD) in order to optionally apply a voltage (V) between a first and a second electrode (1, 2), between which a layer (4) of liquid crystals is arranged. The pixel (3) switches into a non-transparent state when a voltage (V) is applied whose value is greater than or equal to the value of a threshold voltage (VD, VD⁻) between the electrodes (1, 2), a sensor voltage (VS) which changes across a sensor period (T) being applied to at least one of the electrodes (1; 1, 2) as said voltage (V) or part of said voltage (V) in order to generate a sensor signal for detecting an object (5) approaching the pixel (3). Also disclosed are an advantageous liquid crystal display encompassing such a circuit as well as an advantageous communication device (7) comprising a first housing part (8) that is provided with a display device (9), a second housing part (10), and an adjusting mechanism (11) for moving the housing parts into a position in which the display device is located at a distance from the second housing part and moving the housing parts into a position in which the display device adjoins a bottom area (12) of the second housing part, said bottom area (12) being embodied by means of such a liquid crystal display.

18 Claims, 7 Drawing Sheets

(56) References Cited

U.S. PATENT DOCUMENTS

| | | | |
|---|---|---|---|
| 6,057,903 A | 5/2000 | Colgan et al. | |
| 6,239,788 B1* | 5/2001 | Nohno et al. | 345/173 |
| 8,144,115 B2* | 3/2012 | Konicek | 345/104 |
| 2002/0190964 A1* | 12/2002 | Van Berkel | 345/173 |
| 2004/0066367 A1* | 4/2004 | Fagard | 345/156 |
| 2004/0105040 A1 | 6/2004 | Oh et al. | |
| 2004/0227743 A1* | 11/2004 | Brown | 345/204 |
| 2006/0125717 A1* | 6/2006 | Fagard | 345/55 |

OTHER PUBLICATIONS

International Preliminary Report on Patentability, issued Dec. 10, 2008, in PCT Application No. PCT/EP2007/054348.

* cited by examiner

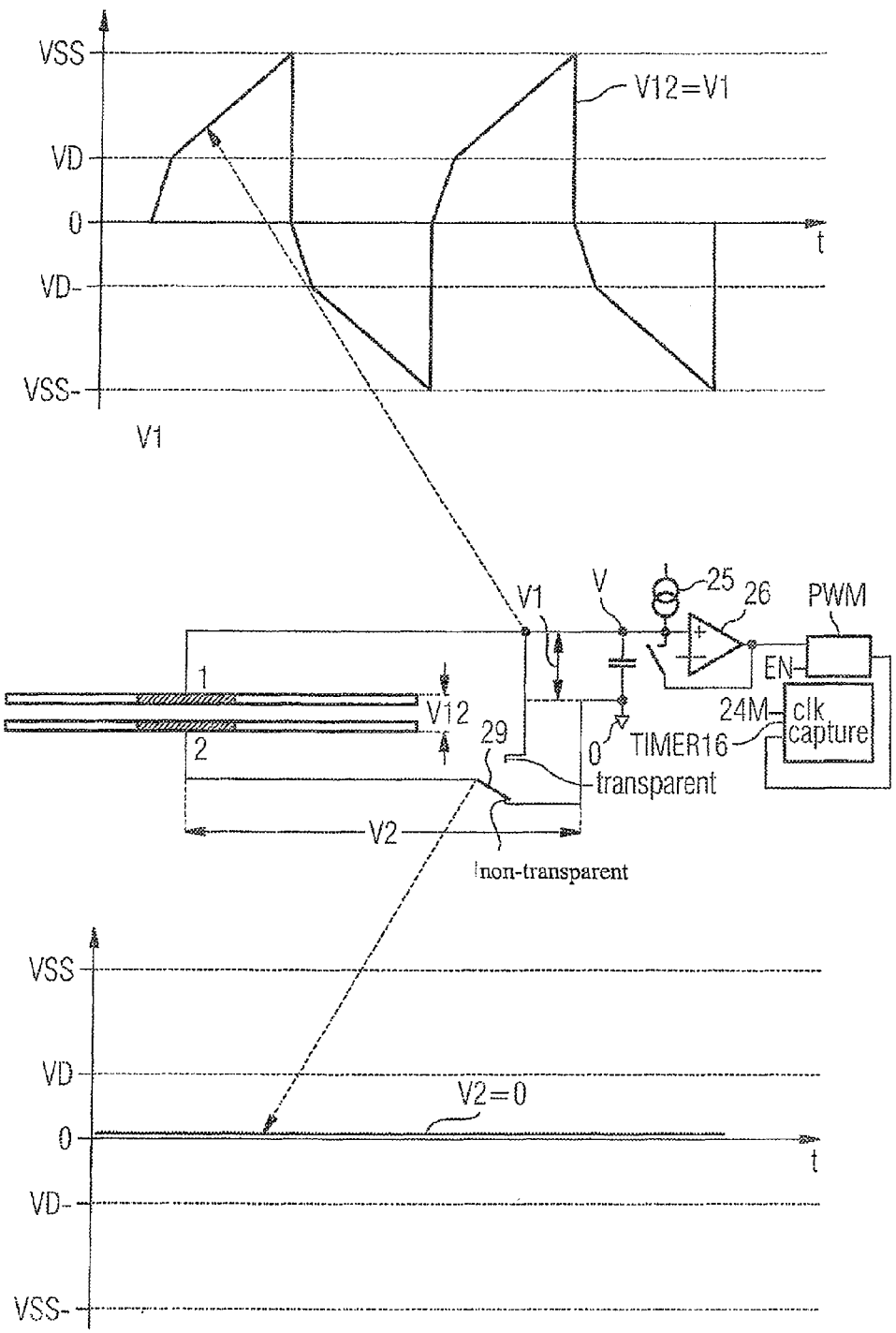

FIG 5B
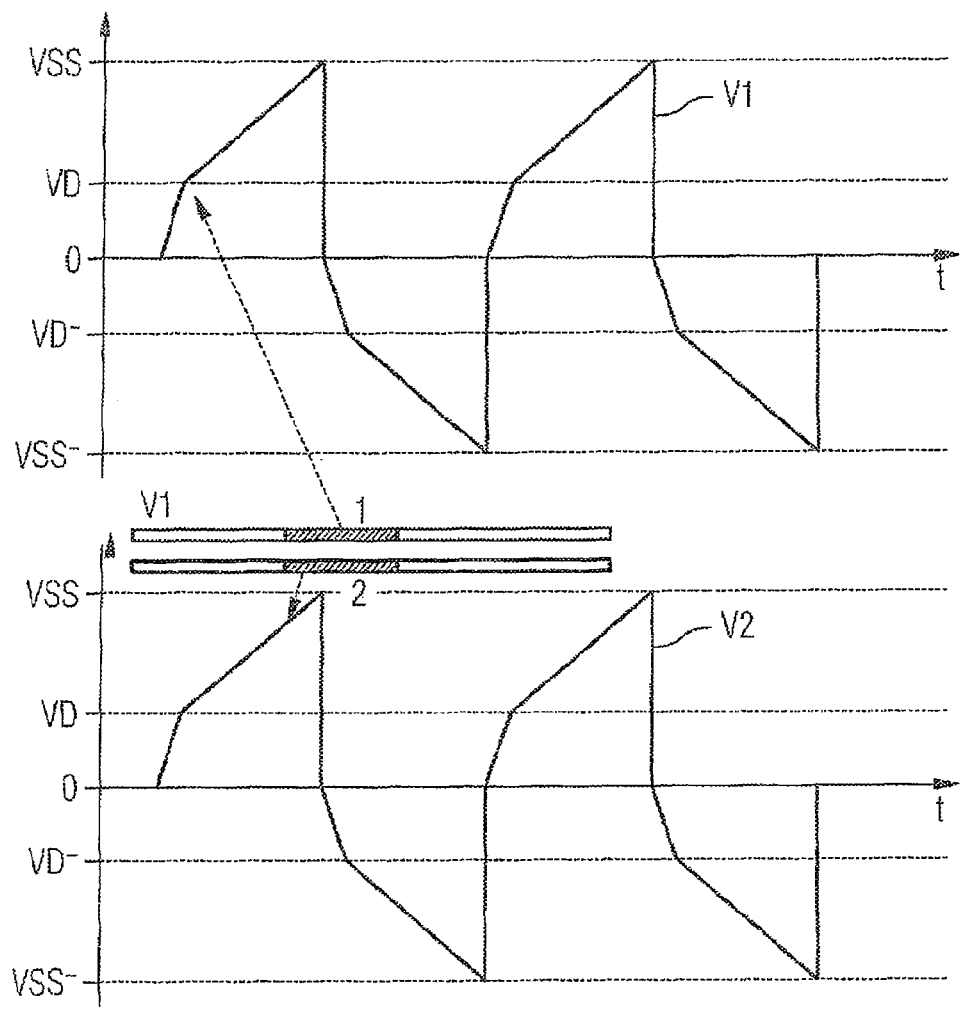
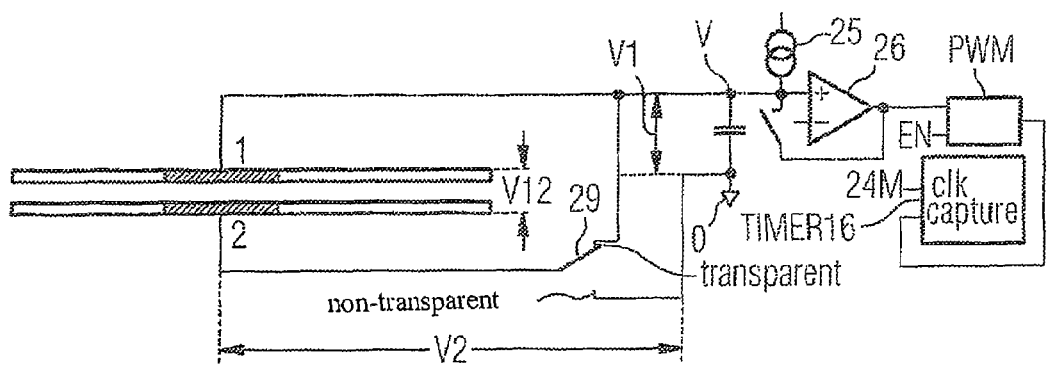

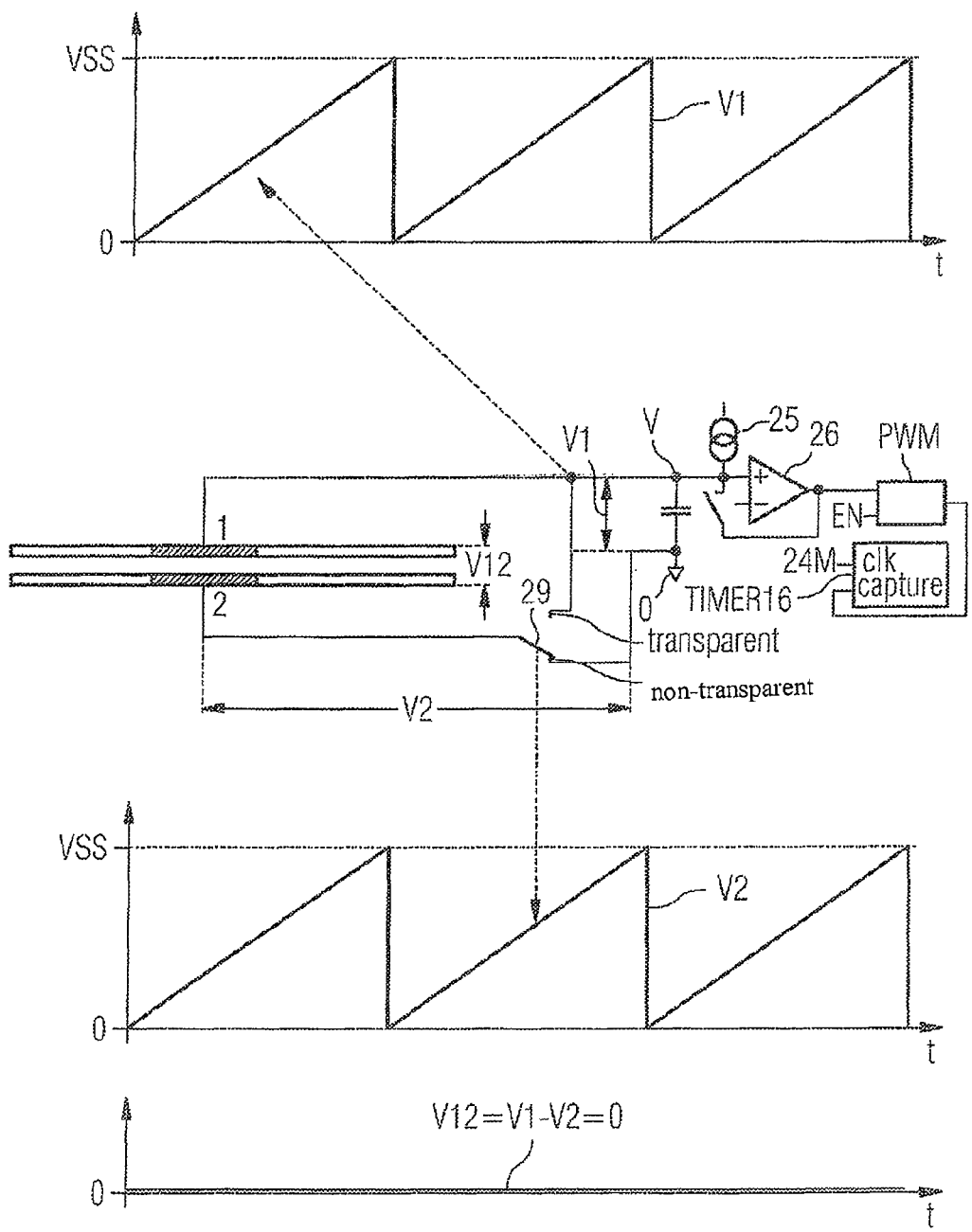

FIG 7
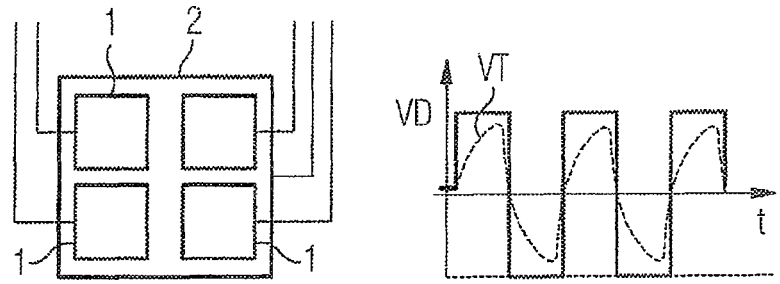
PRIOR ART
FIG 8
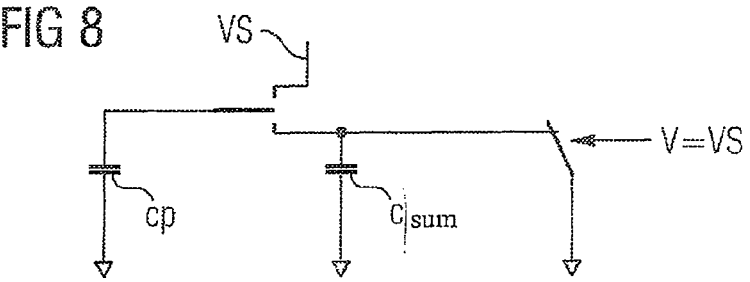
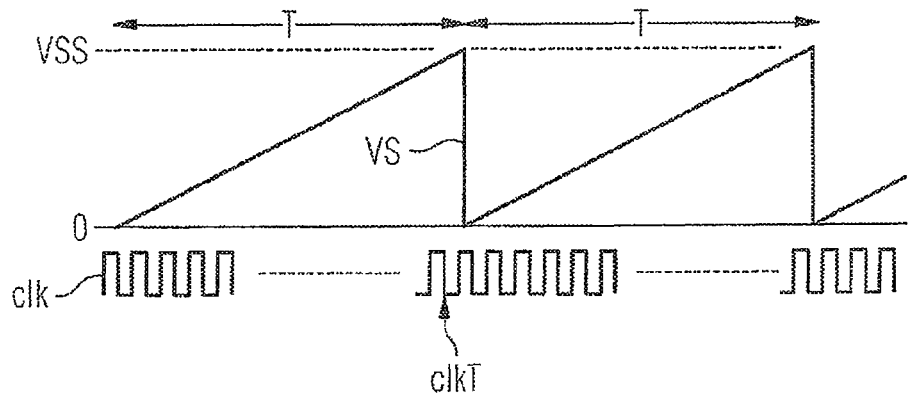
PRIOR ART

LCD CIRCUIT AND A METHOD FOR TRIGGERING AT LEAST ONE PIXEL OF A LIQUID CRYSTAL DISPLAY

CLAIM FOR PRIORITY

This application is a national stage application of PCT/EP2007/054348, filed May 4, 2007, which claims the benefit of priority to German Application No. 10 2006 021 099.9, filed May 5, 2006, the contents of which hereby incorporated by reference.

TECHNICAL FIELD OF THE INVENTION

The invention relates to an LCD circuit for triggering at least one pixel of a liquid crystal display and to a method of triggering a pixel of a liquid crystal display.

BACKGROUND OF THE INVENTION

Liquid crystal displays transmitting light in a transparent state and blocking light in a non-transparent state are generally known. Due to the orientation times of molecules of the liquid crystals used in such a liquid crystal display and to triggering effects with transient and dying-down voltage curves, a transparent state is usually to be understood as a nearly transparent state and a non-transparent state or opaque state is to be understood as a nearly opaque state.

Usually, liquid crystal displays are made up of several layers including two support layers made of glass or plastic, which have one electrode layer, respectively, on each of the surfaces facing each other. Here, one of the electrode layers is subdivided into a multiplicity of individual electrodes in order to assign pixels to each of the respective surfaces of the electrode. The electrodes are formed from indium-tin-oxide (ITO) which is a nearly transparent, but conductive material. Spacers are disposed between the two electrode layers, in order to keep a distance between the electrode layers. In the space between the electrode layers, the liquid crystals are provided, which will orient themselves in accordance with a voltage applied between the two electrodes.

Polarizers in the form of films are applied on the outside of the two support materials. If no voltage or a voltage particularly well below a threshold value is applied to the electrodes, the molecules of the liquid crystals will be oriented such that light may pass through the entire assembly. If the voltage applied to the electrodes exceeds the threshold value, the molecules will re-orientate themselves so that the light incident in the crystal layer is turned and light will be prevented from passing.

FIG. 7 shows an example of an assembly of electrodes 1, 2 as well as a voltage characteristic for triggering the electrodes in such a liquid crystal display. A first electrode layer is subdivided into a multiplicity of individual electrodes 1 used to trigger individual pixels. The second electrode layer is formed as a continuous electrode 2. A voltage V is applied to the individual electrodes, which reaches or exceeds a threshold value VD for switching into a non-transparent state. For triggering a transparent state, the voltage V applied between the electrodes 1, 2 will be left below the threshold value VD.

In the first state with an applied voltage V above the threshold value VD, instead of a constant voltage V with a constant value, an alternating voltage V will be applied in such a way that the voltage will alternately exceed and fall below a positive and a negative threshold value VD, VD⁻, in order to avoid a burn-in effect. The voltage V is therefore usually to be understood as a voltage differential which will be applied between the electrodes effectively nominally and independent from a zero point.

Moreover, touch-sensitive input devices are generally known, which are also formed on the basis of designs having principally the same structure as a liquid crystal display. Such touch-sensitive devices on the basis of ITO electrodes, which are arranged in a spaced relationship to each other, are structurally different from liquid crystal displays particularly due to the fact that no liquid crystal layer is provided in the space between the electrodes. The capacitive sensor layers almost exclusively only include one layer made of metallically transparent electrodes.

At least one of the ITO layers for forming an electrode layer is formed with a multiplicity of individual electrodes and is applied onto an elastic material such as, for example, a film. By applying pressure onto the elastic material, the electrode layers, which are normally spaced apart from each other by the spacer layer, will come into contact with each other, so that a current flow over individual ones of the electrodes is created. An evaluation circuit can assign the current flow of individual electrodes to a certain position on the touch-sensitive input device.

In accordance with another embodiment, the individual electrodes are connected to the evaluation circuit via the capacitor circuit outlined in FIG. 8, in order to detect a capacity change instead of a current flow. In the case of such an arrangement, a saw tooth-shaped sensor voltage VS is applied in a certain timing sequence over a multiplicity of clocks clk to the electrodes lying opposite each other. Once a sensor threshold voltage VSS is reached, the sensor voltage VS will be reset to the initial value and the number of clocks clk elapsed since the last initial value will be counted. Once a certain number of clocks clkT is exceeded, this will be used as a criterion for an object approaching the touch-sensitive device in the area of the corresponding electrodes. The approach of a capacitively active object towards the corresponding electrodes causes a change in the capacity value which will result in a correspondingly longer period of time for the sensor threshold voltage VSS to be reached and thus in a larger number of clocks clkT.

SUMMARY OF THE INVENTION

The invention relates to an LCD circuit and a corresponding method for triggering at least one pixel of a liquid crystal display for providing additional functionality further as well as to suggest a liquid crystal display with enhanced functionality. In particular, new uses and application areas for such a liquid crystal display are to be found.

In one embodiment of the invention, there is an LCD circuit or a method for triggering at least one pixel of a liquid crystal display in order to optionally apply a voltage between a first and a second electrode, between which a layer of liquid crystals is arranged, with the pixel switching into a non-transparent state when a voltage is applied, the value of which is greater than or equal to the value of a threshold voltage between the electrodes, a sensor voltage which changes across a sensor period being applied to at least one of the electrodes as said voltage or part of the voltage independent from the non-transparent or the transparent state, in order to generate a sensor signal for detecting an object approaching the pixel.

In other words, the voltage applied to the electrodes for triggering the pixel is, according to one embodiment, made up of a transparency voltage and a sensor voltage. By means of the transparency voltage, the pixel will be switched into a non-transparent state in a usual manner once the corresponding threshold voltage is exceeded. A non-transparent state is also to be understood here as a state which is usually regarded as non-transparent even if there may still some possible remaining transparency present. The superimposed sensor voltage will also be applied and monitored here in a manner known per se. The overall voltage or the voltage differential between the two electrodes will be controlled in such a way that, in the case of the transparent state of the pixel, the threshold voltage will not be exceeded or will only be exceeded for a period of time sufficiently short so that a molecule orientation of the liquid crystals for switching into the non-transparent state or into an undefined grey state does not yet occur. The voltage differential between the two electrodes will therefore preferably be zero.

Thus, any already existing ITO layers of a usual liquid crystal display will advantageously be additionally used for measuring capacity values in order to determine the position of approaching objects. On the one hand, the circuit will ensure that the existing electrode layers will not lose their effect on the liquid crystals or their molecules in particular across an alternating voltage, and, on the other hand, a capacitive measurement can still be carried out.

In one aspect, the circuit is formed for changing the sensor voltage on the first and the second electrodes for switching into a transparent state of the pixel in such a way that a voltage differential between the two electrodes is equal to zero or that a voltage differential between the two electrodes has a value in which the pixel can still be in a transparent state.

In another aspect, the circuit is designed with a switching device for switching the second electrode to the first electrode for triggering the transparent state.

According to still another embodiment, a transparency voltage as an additional voltage or as an additional voltage component of the voltage is superimposed on the sensor voltage, in order to switch into the non-transparent state. This circuit is preferably designed to switch into a transparent state of the pixel, in order to change the sensor signal within a voltage range between the value of the threshold voltage and the base voltage.

In one aspect, the circuit is designed to switch the pixel into the non-transparent state and for controlling the sensor signal by means of a sensor voltage in a voltage range that goes beyond the threshold voltage.

In another aspect, the circuit is designed both to measure as a sensor signal the value of a capacity of at least one of the two electrodes against a basis voltage and to apply for switching the pixel into the transparent or the non-transparent state by means of a transparency voltage between the electrodes.

In still another aspect, the circuit is designed to apply the changing sensor voltage also during a feedback duration, with a sensor threshold voltage being correspondingly adaptable to a voltage curve during the feedback duration.

In yet another aspect, the circuit is designed for switching the pixel into the non-transparent state and for controlling the sensor signal by means of the sensor voltage in a voltage range lying beyond the threshold voltage. Advantageously, for switching into the non-transparent state, the transparency voltage will accordingly be set to a value equal to or greater than the threshold voltage, so that the sensor voltage will make an additional voltage contribution above the threshold voltage.

Advantageously, a circuit or a corresponding method is provided designed to change the sensor signal in a voltage range below the threshold voltage, in order to switch into a transparent state of the pixel. In other words, the overall voltage is selected so that the threshold voltage is not exceeded and the sensor voltage varies within a range below the threshold voltage.

To this end, particularly a method or a circuit for uniformly changing the sensor signal on the first and the second electrode for switching into a transparent state of the pixel is provided in such a way that a voltage differential between the two electrodes is equal to zero or a voltage differential between the two electrodes is equal to a value at which the pixel can still be in a transparent state. Thus, the sensor voltage is applied to both electrodes and at least the voltage curve of one of the two electrodes is monitored or analysed in order to detect an approaching object.

In another aspect of the invention, a circuit or a corresponding method is designed to superimpose or add the changing sensor voltage on or to the transparency voltage also during a feedback duration, with a sensor threshold voltage duly taking this into account. Such a circuit control will enable in particular also several periods for triggering the transparency voltage and the sensor voltage, since the sensor threshold voltage is in each case adapted accordingly.

Another aspect provides a circuit or a corresponding method which is designed such that both the transparency voltage and the sensor voltage are applied alternately as a positive and a negative voltage. Such a circuitry provides some burn-in protection known per se, since a positive and a negative voltage are alternately applied to the molecules of the liquid crystals between the two electrodes. In such a circuit, during switching into the respectively negative voltage range, of course, a negative threshold value has to be considered for the transparency and a negative sensor threshold value for the sensor function instead of the usually positive threshold values.

Another aspect of the invention provides a circuit or a corresponding method which is designed to apply the sensor period as a fixed period and to output a corresponding sensor signal within that period, which is dependent on a nominally maximum voltage value. In other words, the change of the sensor voltage is carried out in each case across a fixed time period or a fixed number of clocks and, particularly in the case of a saw tooth voltage, after reaching the last clock the maximum value or the minimum value of the voltage is used as the criterion as to whether or not an object is approaching.

In another aspect, there is a circuit or a corresponding method designed to change the sensor voltage during the sensor period up to a specified sensor threshold voltage and for generating a corresponding sensor signal depending on a duration of the sensor period until the specified sensor threshold voltage is reached. In accordance with this alternative circuitry or the corresponding approach, not a fixed period is specified for changing the sensor voltage, but a fixed sensor voltage threshold value is specified and the number of clocks or the duration of the period is measured. If a specified duration or number of clocks is exceeded, then this is used as the criterion for an approaching object, so that the sensor signal is switched accordingly.

Apart from the switching of a sensor signal between two fixed values for signalling an object approaching or no object approaching, it is also possible to output sensor signals having a variable value so that, if applicable, an approach may be evaluated also with regard to its distance or the dimension of the approaching object may be evaluated. The sensor voltage is preferably a saw tooth voltage.

In one aspect, a liquid crystal display includes at least one pixel and a circuit for both switching the transparency of the pixel and generating a sensor signal for signalling an object approaching the pixel. Of advantage are here two electrode layers each with a multiplicity of first or second electrodes, in order to form sensor elements that may be activated from both sides.

furthering another aspect, a communications device comprises a first housing part that is provided with a display device, a second housing part and an adjusting mechanism for moving the housing parts into a position in which the display device is located at a distance from the second housing part and for moving the housing parts into a position in which the display device adjoins a bottom area of the second housing part, said bottom area being embodied by means of such a liquid crystal display.

The communications device is provided with a circuit for switching at least a predominant proportion of pixels of the liquid crystal device into the transparent state in the second position of the housing parts and for switching at least a predominant proportion of pixels of the liquid crystal device into the non-transparent state in the first position.

In yet another aspect, a circuit switches a first electrode layer with the at least one first electrode as the electrode layer facing the display device in the first position of the housing part as a sensor layer for signalling an approaching object. In other words, in this case, the upwards facing bottom area of the second housing part is formed as a sensor layer in the folded-open or slid-open state of the communications device.

In still another aspect, a circuit switches a second electrode layer with the at least second electrode as the electrode layer facing away from the display device in the first position of the housing part as a sensor layer. In other words, in the folded-together state, the bottom layer is formed by a layer which in the transparent state allows a view through the bottom of the folded-together mobile radio device onto the display device of the folded-together or folded-open first housing part, with the outside of this bottom layer being connected as a sensor layer, i.e. in this case the side facing away from the display device.

Such a communications device is additionally provided with a third electrode layer as an electrode layer adjacent to the second electrode layer for forming a sensor layer from the second and the third electrode layers. This allows a sensor device having a finer sensor structuring in the folded-together state to be achieved, provided that the first sensor layer for displaying image symbols or grid patterns has individual electrodes with larger patterns than would be expedient for detection during operation in the folded-together state with the display device under the liquid crystal device forming the bottom layer.

Thus, a foldable mobile radio device may be provided for use as a communications device, in which the first housing part including the display device is folded onto the second housing part, and the display device is disposed opposite a bottom area of the second housing part. The bottom area is not only formed as a transparent surface, so that the display device may be viewed even in a folded-together state, but is provided with additional functions of the preferred liquid crystal display. This means that the bottom area may be connected as a touch-sensitive surface, so that it may be operated in the folded-together state from the outside, which then lies opposite the display area.

By activating individual electrodes of the liquid crystal display, if desired, opaque structures and/or patterns may here be superimposed, which partially obscure the view onto the folded-in display device and show symbols giving instructions for touch activation. However, corresponding symbols may be given, for example, via the display device itself. In the folded-up state, the bottom area formed by the liquid crystal display may also be used as a touch-sensitive input device.

Advantageously, in this state of the communications device, however, the first side with the electrode layer, which in the folded-together state is on the inside, is used as a sensor layer. Through the combined use as a liquid crystal device, individual symbols and/or structures etc. may be superimposed onto the bottom area, which give instructions with regard to functions that may be activated by touch.

In the folded-up state, the entire bottom area formed by the liquid crystal display may be switched into the opaque state, whilst advantageously individual activating areas may be left transparent, in order to show the symbols that may be touched or activated. The technical problem is thus solved by the fact that the bottom layer has to be able to provide transparency, non-transparency and touch-sensitivity depending on the folding state of the communications device.

Apart from the triggering by means of various threshold values and superimposed voltage values in the form of the transparency voltage and the sensor voltage, which are applied only to two electrode layers or their individual electrodes, there is also an alternative solution. This alternative solution includes designing two ITO layers in the usual manner as a liquid crystal display and to bond adhesively or fasten in a different way thereon additional electrode structures, in particular again in the form of ITO structures as an additional further layer. The drawback of this solution compared to the first mentioned solution, however, is an increased thickness, a reduced transparency in the transparent state and a higher construction complexity during manufacturing of the liquid crystal display as well as the wiring thereof.

BRIEF DESCRIPTION OF THE DRAWINGS

An embodiment example will be described in more detail below with reference to the drawings, wherein:

FIGS. 5A and 5B each show two further voltage diagrams for triggering pixel electrodes according to a further embodiment.

FIG. 6 shows still further voltage diagrams for triggering pixel electrodes according to a further embodiment.

FIG. 7 shows a schematic view of the principle of a liquid crystal display according to the prior art.

FIG. 8 shows a schematic view of the principle of triggering a touch-sensitive input device according to the prior art.

DETAILED DESCRIPTION OF THE INVENTION

Figure 1:
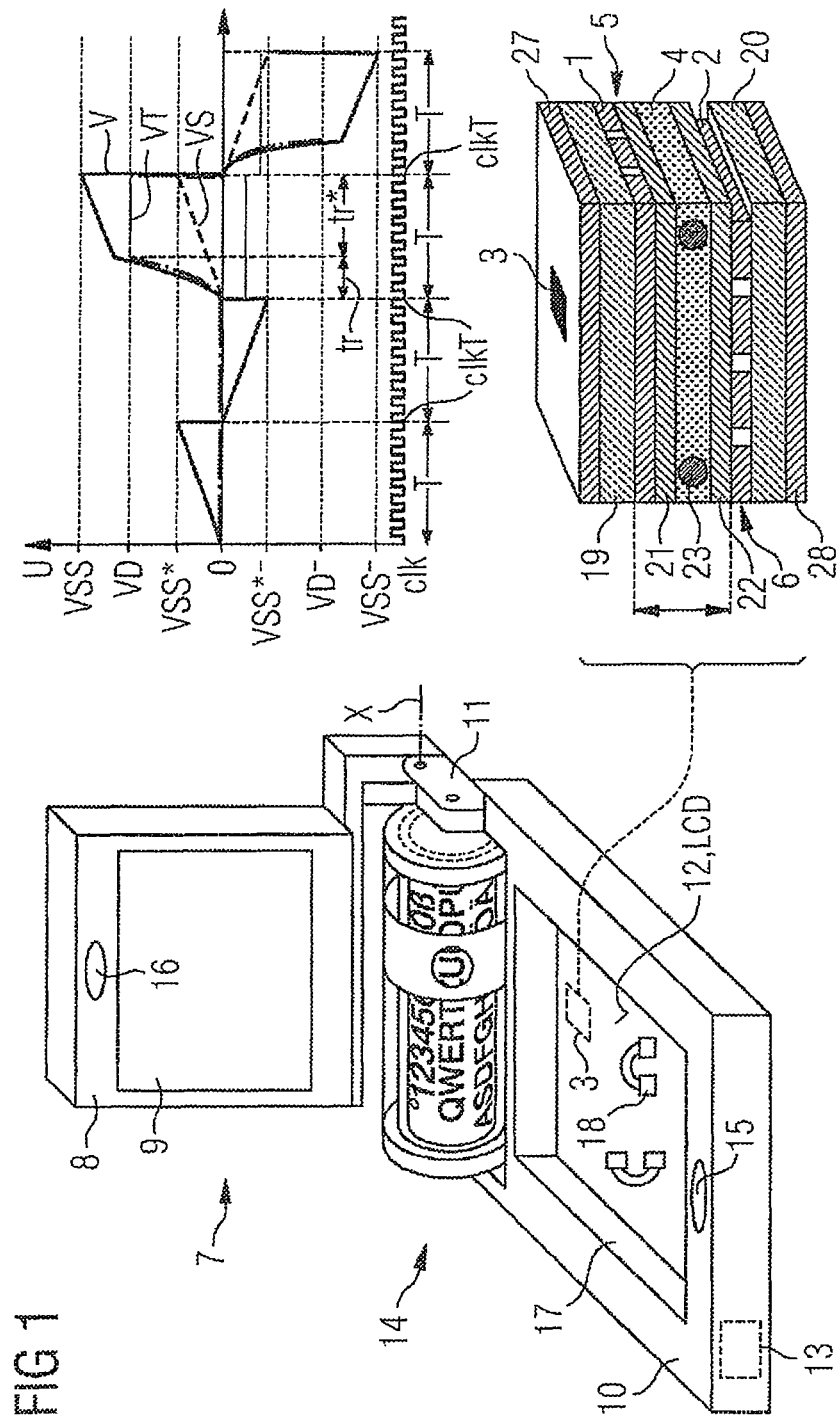
FIG. 1 shows a mobile communications device having a bottom area designed as a liquid crystal display having additional properties as a touch-sensitive input device, and illustrates additionally a cross-sectional diagram through the liquid crystal display as well as a control voltage curve for triggering the same.

As is evident in FIG. 1, a liquid crystal display LCD having additional functionality is provided as a touch-sensitive input device, and such a liquid crystal display may be used as a bottom area 12 of a mobile communications device 7. However, it may also be advantageously implemented in other fields of application where a combination of liquid crystal display and touch-sensitive input device is desired. In essence, it is possible to apply the basic principles of designing a usual liquid crystal display LCD, which are known per se, and the wiring thereof as well as the basic principles of wiring a touch-sensitive input devices on the basis of ITO layers.

The mobile communications device 7 illustrated has a first housing part 8 and a second housing part 10 which may be adjusted relative to each other by means of an adjustment mechanism 11. This adjustment mechanism 11 is in particular an articulated connection that allows the first housing part 8 having a display device 9 integrated therein to be folded against the wall of the second housing part 10. However, as an alternative other mechanisms for pivoting or sliding the corresponding housing parts may be realised. In the illustrated communications device 7, an input device 14 for inputting characters and/or other control instructions may, for example, be provided as a rotationally operable assembly in the area of a pivot axis X for pivoting the two housing parts 8, 10 relative to one another. However, additionally or alternatively also other types of input devices in the form of, for example, keypad elements may be disposed on one or both of the housing parts 8, 10. For speech communication, the two housing parts 8, 10 include a microphone 15 or a speaker 16, as this is known per se from mobile phones.

In a likewise usual manner, the communications device 7 is provided with a circuit 13, in particular with a circuit in the form of an integrated processor. The circuit 13 is used for operating the various functions offered to the user by the communications device 7. This circuit 13 or, if any, a further stand-alone circuit is additionally used to operate the liquid crystal display LCD which is formed as a bottom area in the second housing part 10.

Figure 2:
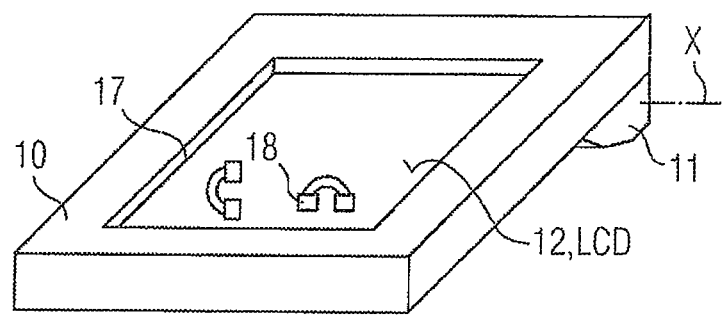
FIG. 2 shows the communications device according to FIG. 1 in a second operating position with a display device of the second housing part folded against the bottom area.

FIG. 1 shows the communications device 7 in a first position in which the second housing part 10 including the display device 9 is located at a distance from the first housing part 8. FIG. 2 shows the communications device 7 of FIG. 1 in a second, folded-together position, in which the display device 9 of the first housing part 8 adjoins the liquid crystal display LCD of the second housing part 10. In this connection, FIG. 2 shows a bottom view with a liquid crystal display LCD which in this view is located at the top. As is evident in particular from FIG. 1, the second housing part 10 preferably has a recess 17, the opening circumference of which corresponds to the first housing part 8 and extends through to the liquid crystal display LCD 12.

In the folded-together state, it is then possible to view the display device 9 with the images, symbols etc. shown thereon through the liquid crystal display LCD, which is now wholly or mainly in the transparent state. As a result, the actual display device 9 remains visible even in the folded-together state. In order to switch the liquid crystal device LDC into the transparent state, no transparency voltage VT will have to be applied to the liquid crystal display LCD or the electrodes thereof.

In the folded-together state, characters, grids and/or symbols 18 may be displayed, if desired, by a corresponding triggering of electrodes of the liquid crystal display LCD and/or the display device 9. Such symbols may advantageously refer to touch-sensitive areas, which may be touched in order to activate functions etc. Such touch-sensitive functionality as an input device is provided by the liquid crystal display LCD having an additional function as a touch-sensitive input device.

In the first position shown in FIG. 1, a user will hold the communications device usually in such a way that the second housing part 10 lies on the user's hand. The upper surface of the bottom area 12, which is exposed once the first housing part 9 has been opened up, will accordingly be facing the user and his/her view. In this position, the liquid crystal display LCD forming the bottom area 12 is preferably connected as a touch-sensitive input device that may be operated from the top. To this end, expediently no longer the bottom electrode layer, but now the top electrode layer of the liquid crystal device will be connected as a touch-sensitive electrode layer.

In this folded-open position, a voltage will preferably be applied across all or nearly all of the liquid crystal display LCD in such a way that it will switch into the non-transparent state. Individual symbols 18, grid lines or other characters may be displayed by means of the liquid crystal device LCD, and the display will be carried out particularly preferably by switching the corresponding symbols and characters to be displayed into the transparent state. In this way, the bottom area 12 of the second housing part 10 may be used as an additional input device with touch-sensitive functionality and at the same time as a display of control elements.

FIG. 1 shows a section of an example of an LCD on an enlarged scale. What is shown is, in a usual manner, two substrates 19, 20 made of a transparent material such as glass, acrylic or plastics. On the surfaces facing each other, a first or a second electrode layer 5, 6 is provided, which are divided into individual electrodes 1, 2 in order to form pixels 3. Usually, further layers such as a hard layer and/or a polyimide layer 21 or 22 are applied onto the surfaces of the two electrode layers 5, 6, which face one another. Between these, a space is defined by individual spacers 23, into which a liquid crystal layer 4 has been inserted. On the outside of the two substrate materials, polarizers have been applied in the form of, for example, films 27, 28.

The voltage diagram schematically shown above the section of the liquid crystal display LCD shows an example of a voltage diagram of a voltage V, which is applied to at least one electrode pair made up of a first electrode 1 and a second electrode 2, which are used for depicting a pixel 3. Moreover, the first electrode 1 or the second electrode 2 additionally serves as a sensor element for touch-sensitive input. The circuit-related evaluations are preferably carried out in relation to capacity in a manner known per se for touch-sensitive input devices, for example according to a principle schematically shown in FIG. 8.

Two different voltage threshold values for the functionalities as a liquid crystal display or as a touch-sensitive input device are provided. The base voltage 0 is, for example, a ground or zero voltage of the circuitry 13, but in principle may also have a different voltage level. On the basis of the base voltage 0, an optional first sensor voltage threshold VSS* will be closest to the base voltage 0. Above this first sensor voltage threshold VSS*, there is a threshold voltage VD for the functionality as a liquid crystal display LCD, and above this threshold voltage VD there is a further sensor threshold voltage VSS for the sensor functionality.

The voltage diagram shows a first state of the liquid crystal displays LCD or the corresponding pixel 3 with a transparent state over two first periods T. The curve of the voltage V applied to the two electrodes 1, 2 remains below the threshold value VD. In two subsequent periods T, the second state of the liquid crystal display LCD or of the pixel 3 triggered by the voltage V is schematically shown. In this state, the voltage increases starting from the base voltage 0 during an initial time period as a feedback duration tr, which is shorter than or equal to a feedback period customary for liquid crystal displays, up to the threshold voltage VD or up to the voltage ranges above the threshold voltage VD, and will for the remaining time tr* of this period T remain in the voltage range which is equal to or higher than the threshold voltage VD. By this means, the corresponding pixel 3 will be switched into the non-transparent state for the duration of the third and the fourth periods T.

Triggering of the transparent or the non-transparent state is carried out by means of a threshold voltage VT, which, for example during the first two periods T, will preferably be equal to the base voltage 0 and will, for example during the two next periods T, increase respectively for at least the second time period tr* up to the threshold voltage VD and will stay there.

In order to prevent burn-in, a transparency voltage VT alternately switched to the positive or the negative range is applied to the electrodes, so that as shown the curve of the voltage V for each second period T will not be switched to the positive, but to the negative voltage range. Accordingly, further threshold values VSS*−, VD− and VSS− are provided in the negative voltage range, and an evaluation may be carried out on the basis of the nominal voltage values.

It is an essential feature of this embodiment that, for the sensor functionality, a sensor voltage VS is superimposed on or added to the transparency voltage VT. The voltage V applied to the electrodes 1, 2 will thus be made up of the transparency voltage VT and additionally the sensor voltage VS.

The sensor voltage VS has a periodic curve over the respective periods T; in principle, any continuously changing voltage function may be used. However, voltage curves of the saw tooth type, which at the start of each period T begin with the base voltage 0 and the nominal value of which increases continuously depending on the respective period in the positive or the negative direction in a manner known per se, are particularly preferred.

Once the first threshold voltage VSS* has been reached, the period T will end and the sensor voltage VS will be returned to the base voltage 0. Across this period T, a number clkT of clocks clk will be counted within the period T. If an object 5 approaches the electrodes 1, 2 of the pixel 3, the capacity value will increase so that a higher number of clocks is needed for the sensor threshold voltage VSS* or VSS*− to be reached and thus the period T ends. Thus, the number clkT of clocks clk is a direct measurement for an object 5 approaching the electrodes 1, 2. In addition to a customary circuit for triggering the pixels 3 or for triggering their electrodes 1, 2 for switching into a transparent or non-transparent state, therefore, a capacity present on the electrodes 1, 2 or on at least one of the electrodes 1, 2 is taken into account.

Due to the superimposition of the transparency voltage VT and the sensor voltage VS, the respective first sensor voltage VSS*, VSS*− will necessarily be exceeded in the depicted third and fourth periods, without giving, in doing so, a relevant criterion for the sensor property. Accordingly, the second sensor threshold VSS, VSS− is used as a criterion for an approaching object 5, if the pixel 3 assigned to the electrodes 1, 2 is to be switched into the non-transparent state.

Instead of making the period duration T dependent on reaching the first or the second sensor threshold voltage VSS*, VSS, which requires an adaptation of the switching periods for the transparency voltage VT or might, if applicable, require a complicated variable fixing of the sensor voltage thresholds, a possible alternative could also be an embodiment having a fixed period T. In this case it is checked whether or not the voltage V applied to the electrodes exceeds a correspondingly selected sensor threshold voltage VSS* or VSS within the period T.

Instead of a binary signal value for indicating an approaching object 5 or no approaching object 5 it is also possible to output a variable value as a sensor signal. In the case of the first embodiment with a variable period duration, the value of the number clkT of the clocks during the period T could be used as a direct measurement for the state of an approaching object 5. In the case of the second embodiment having a fixed period T, the maximum voltage V reached during the period T would represent such a variable value.

Figure 3:
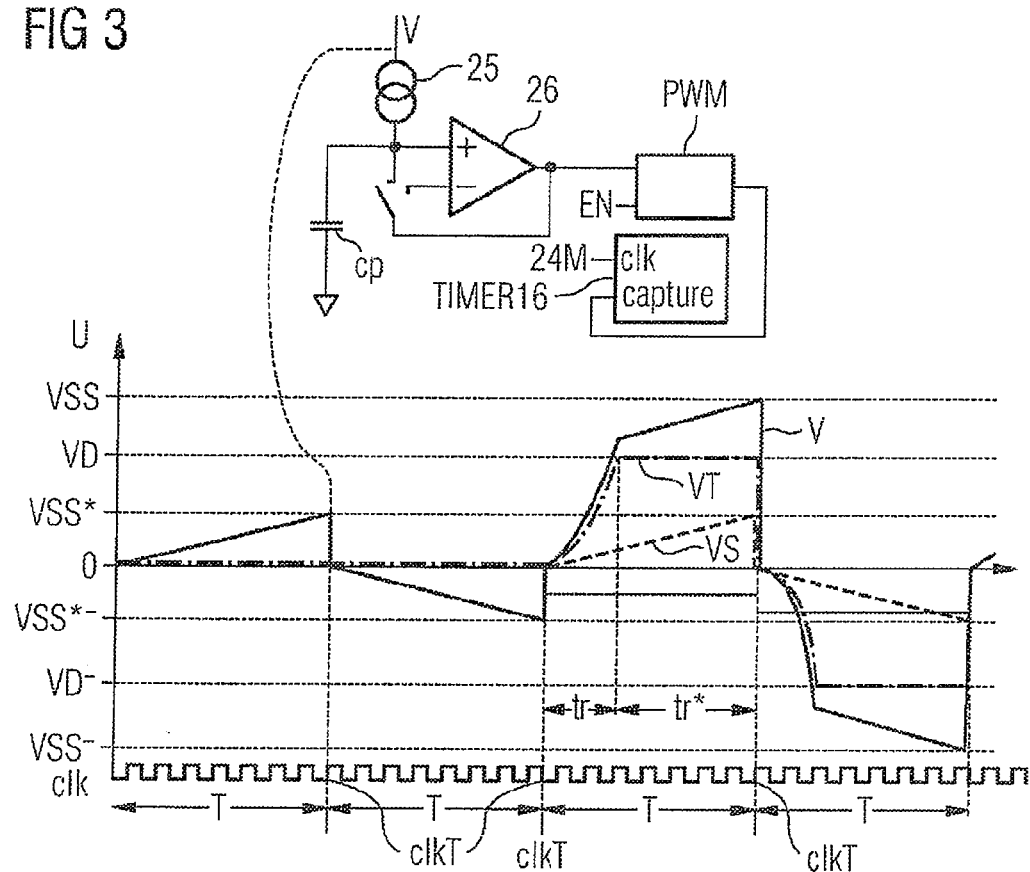
FIG. 3 shows an enlarged view of the voltage diagram of FIG. 1.

In addition to the voltage diagram schematically shown in FIG. 1, FIG. 3 shows a schematic view of a sensor device circuitry per se known. In this case, the sensor voltage VS is supplied by a suitable voltage source or current source 25 having a current limiter for generating the increasing voltage. For example, such a current source 25 may be formed by a transistor including a Zener diode. The voltage will be applied to one of the two electrodes 1 or to both electrodes 1, 2, with the two electrodes 1, 2 having a capacity value cp between them. This capacity value CP will increase during the approach of an object 5, so that the slope of the voltage curve will be less steep. By means of the operational amplifier 26 as well as further downstream components, the approach of an object 5 will be determined in a usual manner. The circuit 25 will preferably apply a voltage V having various levels depending on whether a transparent or a non-transparent state is to be triggered.

FIG. 3 shows that, in particular in the case of the circuit of the non-transparent state, the curve within one period is not linear, but rather increasing in a varying manner, since in practice in particular the transparency voltage VT will not be present as a pure square-wave voltage due to, amongst others, relaxation effects.

Figure 4:
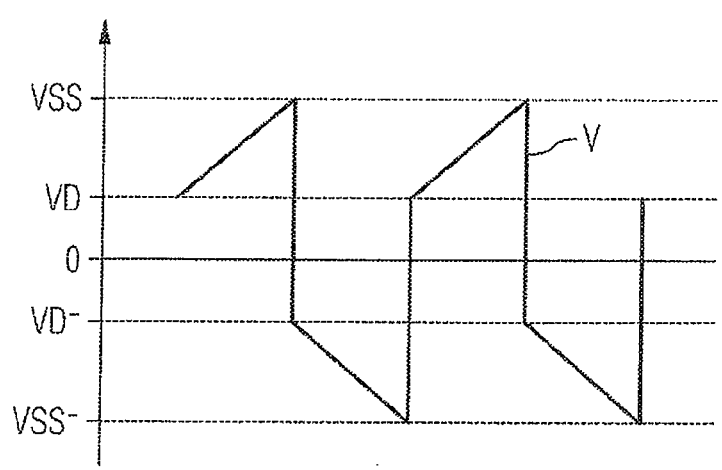
FIG. 4 shows an alternative voltage diagram.

FIG. 4 shows an alternative voltage curve for the case where the transparency voltage VT is applied as a pure square-wave voltage and the purely saw tooth-shaped sensor voltage VS is superimposed on this for the case of four periods with alternating signs and pixel 3 is switched into the non-transparent state.

FIGS. 5A and 5B show a further embodiment of connecting the first and second electrodes 1, 2 forming the pixel 3, with pixel 3 at the same time serving as a sensor element. The top voltage curve shows the voltage V1 of the first electrode 1. The bottom voltage curve shows the voltage V2 of the second electrode 2. V12 symbolises the voltage differential between the electrodes 1 and 2. Also shown is the circuit of FIGS. 1 and 3 complemented, however, by a switch as a switching device 29.

The switching device 29 is used for connecting or particularly short-circuiting the two electrodes 1 and 2 for triggering the transparent state (FIG. 5B). As a result, the voltages applied to both electrodes 1, 2 will be on the same level as the sensor voltage VS and they will have the same value as one another, i.e. V1=V2. The voltage differential V12 will accordingly be equal to zero. In the other switching state, the switching device 29 is used to disconnect the two electrodes 1 and 2 from each other for triggering the non-transparent state and to pull a second electrode to the base voltage 0 or ground (FIG. 5A). Here, the first electrode 1 will be on the sensor voltage VS which is high enough above the value of the voltage differential V12 or the threshold value VD in order to blacken pixel 3.

FIG. 6 shows the principle of the voltages V1, V2 according to FIG. 5A. This shows a schematic view of an alternative circuit having a voltage source 25 which will generate, instead of an alternating voltage V, a voltage V having a saw tooth-like curve increasing in just one direction.

Not only combinations of the individually described components and functions are possible, but also modified embodiments based on the same basic concepts may be advantageously implemented. For example, in the opened condition of the mobile device, the entire then bottom area of the second electrode layer 6 may advantageously be connected to ground, in order to prevent any interfering influences by the hand of a user holding the device.

The invention claimed is:

1. A mobile computing device comprising:
a display device including a plurality of pixels, the plurality of pixels including a first pixel that comprises (i) first and second electrodes, and (ii) a layer of liquid crystals positioned between the first and second electrodes;
a voltage source; and
a processor to:
detect an object approaching the first pixel in each of a transparent mode and a non-transparent mode of the first pixel;
when operating the first pixel in the transparent mode, detect the object approaching the first pixel by measuring an amount of time needed for a voltage provided across the first and second electrodes to increase to a sensor threshold voltage level associated with the transparent mode; and
when operating the first pixel in the non-transparent mode:
detect the object approaching the first pixel by causing a variable voltage provided across the first and second electrodes of the first pixel using the voltage source, the variable voltage having a voltage amount composed of (i) a first voltage amount corresponding to a non-transparency threshold voltage level in which the first pixel is non-transparent, wherein the non-transparency threshold voltage level is greater than the sensor threshold voltage level associated with the transparent mode, and (ii) a second voltage amount that periodically increases at a predetermined rate starting at a first time until the variable voltage reaches a sensor threshold voltage level associated with the non-transparent mode at a second time; and
measure an elapsed duration of time between the first time and the second time; and
determine that the elapsed duration of time is greater than a predetermined period of time.

2. The mobile computing device as claimed in claim 1, wherein the first electrode is part of a first layer of a first plurality of electrodes, and the second electrode is part of a second layer of a second plurality of electrodes.

3. The mobile computing device as claimed in claim 1, further comprising a switching device for short-circuiting the first and second electrodes.

4. The mobile computing device as claimed in claim 1, wherein the second voltage amount corresponds to a sensor voltage, and wherein in response to the variable voltage reaching the sensor threshold voltage level associated with the non-transparent mode, the processor causes the variable voltage to be set to 0.

5. The mobile computing device as claimed in claim 1, wherein the processor further determines a distance of an approaching object based on the elapsed duration of time.

6. The mobile computing device as claimed in claim 5, wherein the processor is configured to:
measure a first capacity of the first electrode against a base voltage,
measure a second capacity of the second electrode against base voltage, and
determine that the variable voltage has reached the non-transparency threshold voltage based on the first and second capacities.

7. The mobile computing device as claimed in claim 1, wherein the processor causes the second voltage amount to periodically increase at a predetermined rate by following a nonlinear voltage curve.

8. The mobile computing device as claimed in claim 1, wherein the processor reduces the variable voltage to a negative voltage after the first duration of time.

9. The mobile computing device as claimed in claim 1, wherein the processor is configured to output, depending on a maximum value of the variable voltage, a corresponding sensor signal within the first duration of time.

10. The mobile computing device as claimed in claim 1, wherein the predetermined period of time is calculated by determining, for a default voltage provided across the first and second electrodes of the first pixel, the default voltage having a default voltage amount composed of (i) a first default voltage amount corresponding to the non-transparency threshold voltage level in which the first pixel is non-transparent and (ii) a second default voltage amount that periodically increases at the predetermined rate starting at a beginning time until the default voltage reaches the sensor threshold voltage level associated with the non-transparent mode at an end time, the amount of time elapsed between the beginning time and end time in an absence of an object approaching the first pixel.

11. The mobile computing device as claimed in claim 1, wherein the variable voltage is a saw tooth-like voltage.

12. A liquid crystal display comprising:
a plurality of pixels, the plurality of pixels including a first pixel comprising a first electrode layer, a second electrode layer, and a layer of liquid crystals positioned between the first and second electrode layers;
wherein the liquid crystal display is coupled to a processor for:
detecting an object approaching the first pixel in each of a transparent mode and a non-transparent mode of the first pixel;
when operating the first pixel in the transparent mode, detecting the object approaching the first pixel by measuring an amount of time needed for a voltage provided across the first and second electrodes to increase to a sensor threshold voltage level associated with the transparent mode; and
when operating the first pixel in the non-transparent mode:
detecting the object approaching the first pixel by causing a variable voltage provided across the first and second electrode layers of the first pixel using a voltage source, the variable voltage having a voltage amount composed of (i) a first voltage amount corresponding to a non-transparency threshold voltage level in which the first pixel is non-transparent, wherein the non-transparency threshold voltage level is greater than the sensor threshold voltage level associated with the transparent mode, and (ii) a second voltage amount that periodically increases at a predetermined rate from a first time until the variable voltage reaches a sensor threshold voltage level associated with the non-transparent mode at a second time;
measure an elapsed duration of time between the first time and the second time; and
determine that the elapsed duration of time is greater than a predetermined period of time.

13. The liquid crystal display as claimed in claim 12, wherein the first and second electrode layers each have a plurality of first or second electrodes for forming sensor elements to be activated from both sides.

14. A method performed by one or more processors for detecting an object approaching a first pixel of a display device, comprising:
- detecting an object approaching the first pixel in each of a transparent mode and a non-transparent mode of the first pixel, wherein the pixel comprises (i) first and second electrodes, and (ii) a layer of liquid crystals positioned between the first and second electrodes;
- when operating the first pixel in the transparent mode, detecting the object approaching the first pixel by measuring an amount of time needed for a voltage provided across the first and second electrodes to increase to a sensor threshold voltage level associated with the transparent mode; and
- when operating the first pixel in the non-transparent mode:
  - detecting the object approaching the first pixel by causing a variable voltage provided across the first and second electrodes of the pixel using a voltage source, the variable voltage having a voltage amount composed of (i) a first voltage amount corresponding to a non-transparency threshold voltage level in which the first pixel is non-transparent, wherein the non-transparency threshold voltage level is greater than the sensor threshold voltage level associated with the transparent mode, and (ii) a second voltage amount that periodically increases at a predetermined rate from a first time until the variable voltage reaches a sensor threshold voltage level associated with the non-transparent mode at a second time;
  - measuring an elapsed duration of time between the first time and the second time; and
  - determining that the elapsed duration of time is greater than a predetermined period of time.

15. The method as claimed in claim 14, wherein the first electrode is part of a first layer of a first multiplicity of electrodes and the second electrode is part of a second layer of a second multiplicity of electrodes.

16. The method as claimed in claim 15, wherein the second electrode is connected to the first electrode to short-circuit into the transparent mode.

17. The method as claimed in claim 14, wherein the second voltage amount corresponds to a sensor voltage, and further comprising, in response to the variable voltage reaching the sensor threshold voltage level associated with the non-transparent mode, causing the variable voltage to be set to 0.

18. The method as claimed in claim 14, further comprising determining a distance of an approaching object based on the elapse duration of time.

* * * * *